United States Patent
Kim et al.

(10) Patent No.: US 10,902,846 B2
(45) Date of Patent: Jan. 26, 2021

(54) SPOKEN LANGUAGE UNDERSTANDING APPARATUS AND SPOKEN LANGUAGE UNDERSTANDING METHOD USING THE SAME

(71) Applicants: Hyundai Motor Company, Seoul (KR); Kia Motors Corporation, Seoul (KR); HYUNDAI MNSOFT, INC., Seoul (KR); SNU R&DB FOUNDATION, Seoul (KR)

(72) Inventors: Bi Ho Kim, Gyeonggi-do (KR); Sung Soo Park, Seoul (KR); Sang Goo Lee, Seoul (KR); You Hyun Shin, Seoul (KR); Kang Min Yoo, Seoul (KR); Sang Hoon Lee, Seoul (KR); Myoung Ki Sung, Seoul (KR)

(73) Assignees: Hyundai Motor Company, Seoul (KR); Kia Motors Corporation, Seoul (KR); HYUNDAI MNSOFT, INC., Seoul (KR); SNU R&DB FOUNDATION, Seoul (KR)

( * ) Notice: Subject to any disclaimer, the term of this patent is extended or adjusted under 35 U.S.C. 154(b) by 134 days.

(21) Appl. No.: 16/215,883

(22) Filed: Dec. 11, 2018

(65) Prior Publication Data
US 2019/0333500 A1 Oct. 31, 2019

(30) Foreign Application Priority Data
Apr. 30, 2018 (KR) .......................... 10-2018-0050144

(51) Int. Cl.
*G10L 15/00* (2013.01)
*G10L 15/18* (2013.01)
(Continued)

(52) U.S. Cl.
CPC ........ *G10L 15/1815* (2013.01); *G06F 40/284* (2020.01); *G06F 40/30* (2020.01);
(Continued)

(58) Field of Classification Search
CPC ...................................................... G06F 17/02
(Continued)

(56) References Cited

U.S. PATENT DOCUMENTS

| | | | |
|---|---|---|---|
| 7,822,699 B2 * | 10/2010 | Katariya | G06F 16/3334 706/45 |
| 2008/0140389 A1 * | 6/2008 | Funakoshi | G06F 40/30 704/9 |

(Continued)

*Primary Examiner* — Jesse S Pullias
(74) *Attorney, Agent, or Firm* — Mintz Levin Cohn Ferris Glovsky and Popeo, P.C.; Peter F. Corless (57) ABSTRACT

A spoken language understanding apparatus according to embodiments of the present disclosure may include: a slot tagging module including: a morpheme analysis unit configured to analyze morphemes with respect to an uttered sentence, a slot tagging unit configured to tag slots corresponding to a semantic entity from a plurality of input tokens generated according to the analyzed morphemes, and a slot name conversion unit configured to convert phrases corresponding to the tagged slots into delexicalized slot names based on neighboring contextual information; and a language generation module configured to generate a combined sequence by combining the delexicalized slot names based on the plurality of input tokens.

4 Claims, 6 Drawing Sheets

(51) Int. Cl.
  *G10L 15/22* (2006.01)
  *G10L 15/02* (2006.01)
  *G06F 40/30* (2020.01)
  *G06F 40/284* (2020.01)

(52) U.S. Cl.
  CPC .............. *G10L 15/02* (2013.01); *G10L 15/22* (2013.01); *G10L 2015/025* (2013.01)

(58) Field of Classification Search
  USPC ......................... 704/1, 9, 10, 257, 270–275
  See application file for complete search history.

(56) References Cited

U.S. PATENT DOCUMENTS

| | | | | |
|---|---|---|---|---|
| 2009/0281792 | A1* | 11/2009 | Green | G06F 16/258 704/9 |
| 2012/0053945 | A1* | 3/2012 | Gupta | G10L 15/22 704/256 |
| 2015/0095033 | A1* | 4/2015 | Boies | G10L 15/1815 704/257 |
| 2015/0331852 | A1* | 11/2015 | Rylov | G06F 40/242 704/9 |
| 2017/0352347 | A1* | 12/2017 | Sharma | G10L 15/16 |

* cited by examiner

|          | What | is | the | seating | capacity | of | the | aircraft | 00s            |
|----------|------|----|-----|---------|----------|----|-----|----------|----------------|
| gold     | O    | O  | O   | O       | O        | O  | O   | O        | B-aircraft_code |
| ours     | O    | O  | O   | O       | O        | O  | O   | O        | B-aircraft_code |
| baseline | O    | O  | O   | O       | O        | O  | O   | O        | B-round_trip   |

FIG. 7

|          | What | is | the | seating | capacity | of | the | aircraft | m00            |
|----------|------|----|-----|---------|----------|----|-----|----------|----------------|
| gold     | O    | O  | O   | O       | O        | O  | O   | O        | B-aircraft_code |
| ours     | O    | O  | O   | O       | O        | O  | O   | O        | B-aircraft_code |
| baseline | O    | O  | O   | O       | O        | O  | O   | O        | O              |

| | i | need | flights | departing | from | oakland | and | arriving | salt | lake | city |
|---|---|---|---|---|---|---

| | Find | me | a | flight | from | cincinnati | to | any | airport | in | the | New | york | city | area |
|---|---|---|---|---|---|---|---|---|---|---|---|---|---|---|---|
| gold | O | O | O | O | O | B-from_loc.city_name | O | O | O | O | O | B-to_loc.city_name | I-to_loc.city_name | I-to_loc.city_name | O |
| ours | O | O | O | O | O | B-from_loc.city_name | O | O | O | O | O | B-to_loc.city_name | I-to_loc.city_name | I-to_loc.city_name | O |
| baseline | O | O | O | O | O | B-from_loc.city_name | O | O | O | O | O | B-city_name | I-city_name | I-city_name | O |

FIG. 9

SPOKEN LANGUAGE UNDERSTANDING APPARATUS AND SPOKEN LANGUAGE UNDERSTANDING METHOD USING THE SAME

CROSS-REFERENCE TO RELATED APPLICATION

This application claims the benefit of priority to Korean Patent Application No. 10-2018-0050144, filed on Apr. 30, 2018 in the Korean Intellectual Property Office, the disclosure of which is hereby incorporated by reference as if fully set forth herein.

BACKGROUND OF THE DISCLOSURE

Field of the Disclosure

The present disclosure relates generally to a spoken language understanding apparatus and, more particularly, to a spoken language understanding apparatus for simultaneously learning slot tagging and language generation and a spoken language understanding method using the apparatus.

Discussion of the Related Art

With the recent advent of dialogue system services, such as Siri® of Apple®, Google Assistant® of Google®, Alexa® of Amazon®, intelligent secretary, and dialogue navigation systems, technology for understanding spoken languages has become increasingly important. To create a dialogue system, a dialogue manager needs to understand the intent of spoken dialogue through spoken language understanding (SLU), as well as manage corresponding content.

SLU, which refers to analyzing speech-recognized utterances to extract slots in accordance with a semantic structure, plays an important role in many natural language processing or dialogue systems. However, general spoken language understanding apparatuses have the following problems.

First, when only slot tagging is learned, out-of-vocabulary (OOV) processing is limited.

Figure 1:
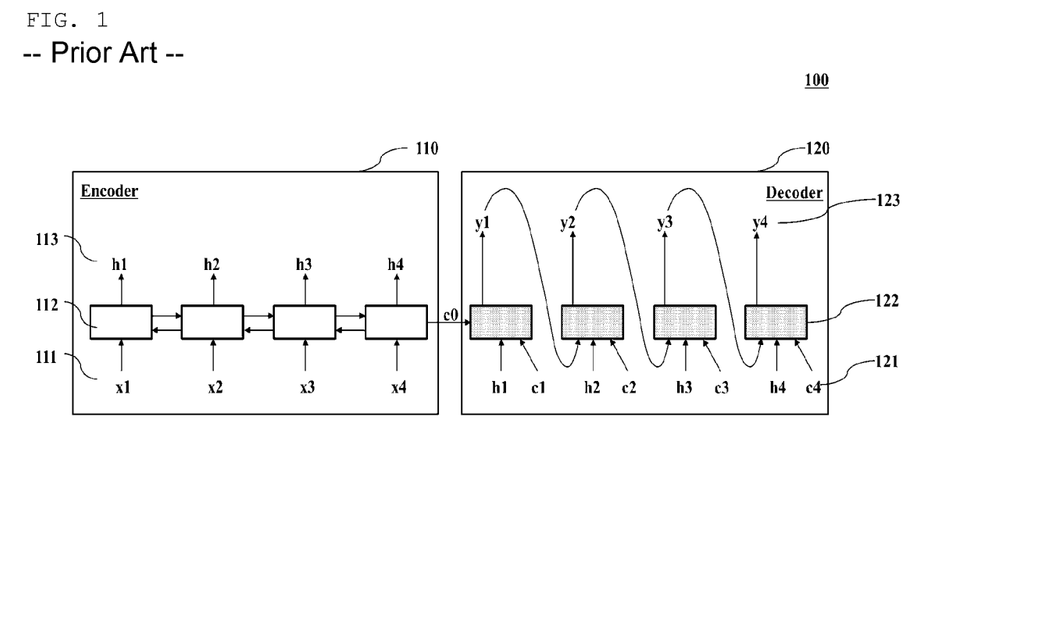
FIG. 1 is a diagram showing a model which learns only slot tagging.

FIG. 1 is a diagram showing a conventional model 100 which learns only slot tagging.

As shown in FIG. 1, the model learns only a slot label using a sequence-to-sequence attention model. The sequence-to-sequence attention model attempts to generate a probability model of converting a source sequence corresponding to input data into a target sequence corresponding to output data through an encoder 110 and a decoder 120. The encoder 110 inputs input tokens 111 (x1 to x4) constituting the source sequence to a neural network 112 to output hidden states 113 (h1 to h4), and the decoder 120 inputs the hidden states 113 and attentions 121 (c1 to c4) to a neural network 122 to output the target sequence including output tokens 123 (y1 to y4), thereby predicting a slot label. However, the aforementioned model, which has learned only slot tagging, learns only a slot label (e.g., output token) with respect to each word (e.g., input token), and thus cannot perform accurate slot tagging when an OOV is input in spite of a sentences in the same pattern.

Second, when slot tagging and a language model are simultaneously learned, performance of slot tagging deteriorates due to noise caused by the language model.

Figure 2:
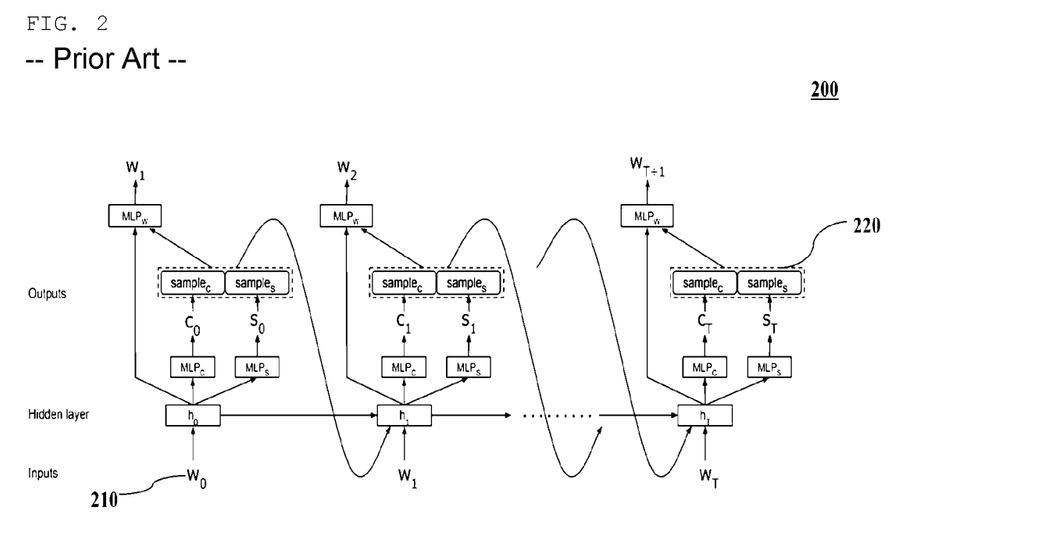
FIG. 2 is a diagram showing a model which simultaneously learns slot tagging and a language model.

FIG. 2 is a diagram showing a conventional model 200 which simultaneously learns slot tagging and a language model.

As shown in FIG. 2, when the language model 210 and slot tagging 220 are simultaneously learned, insufficient learning data may obstruct learning because the size of a vocabulary $w_t$ is greater than the size of a slot label $s_t$. In addition, an operation which requires a user's intent, such as slot tagging, generally has a data scale that is not sufficient to learn a language model, and thus operation of the language model may deteriorate.

Accordingly, there is a demand for a robust spoken language understanding model capable of improving the performance of processing OOV words and enhancing slot label extraction performance.

SUMMARY OF THE DISCLOSURE

An object of embodiments disclosed herein is to provide a spoken language understanding apparatus and a spoken language understanding method using the apparatus for learning contexts with respect to sentences in the same pattern according to output of a delexicalized slot name and/or a sentence for an input sentence and improving slot tagging performance for OOV words.

It will be appreciated by persons skilled in the art that the objects that could be achieved with the present disclosure are not limited to what has been particularly described hereinabove and the above, and other objects that the present disclosure could achieve will be more clearly understood from the following detailed description.

According to embodiments of the present disclosure, a spoken language understanding apparatus may include: a slot tagging module including: a morpheme analysis unit configured to analyze morphemes with respect to an uttered sentence, a slot tagging unit configured to tag slots corresponding to a semantic entity from a plurality of input tokens generated according to the analyzed morphemes, and a slot name conversion unit configured to convert phrases corresponding to the tagged slots into delexicalized slot names based on neighboring contextual information; and a language generation module configured to generate a combined sequence by combining the delexicalized slot names based on the plurality of input tokens.

In addition, according to embodiments of the present disclosure, a spoken language understanding method may include: tokenizing an uttered sentence according to an analysis of morphemes with respect to the uttered sentence; tagging slots corresponding to a semantic entity from a plurality of input tokens generated according to the analyzed morphemes; converting phrases corresponding to the tagged slots into delexicalized slot names based on neighboring contextual information; and generating a combined sequence by combining the delexicalized slot names based on the plurality of input tokens.

According to embodiments of the present disclosure, it is possible to learn a context with respect to sentences in the same pattern by simultaneously learning slot tagging and language generation and outputting a delexicalized slot name and/or a sentence for an input sentence. Further, even when a token including OOV words is input, a slot corresponding to the token can be extracted and thus slot tagging performance can be improved.

It will be appreciated by persons skilled in the art that the effects that can be achieved with the present disclosure are not limited to what has been particularly described hereinabove, and other advantages of the present disclosure will be more clearly understood from the following detailed description.

BRIEF DESCRIPTION OF THE DRAWINGS

The embodiments herein may be better understood by referring to the following description in conjunction with the accompanying drawings, briefly described below, in which like reference numerals indicate identically or functionally similar elements.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE DISCLOSURE

Reference will now be made in detail to embodiments, examples of which are illustrated in the accompanying drawings. While the disclosure is susceptible to various modifications and alternative forms, specific embodiments thereof are shown by way of example in the drawings. However, the disclosure should not be construed as limited to the embodiments set forth herein, but on the contrary, the disclosure is to cover all modifications, equivalents, and alternatives falling within the spirit and scope of the embodiments.

While terms, such as "first", "second", etc., may be used to describe various components, such components must not be limited by the above terms. The above terms are used only to distinguish one component from another. In addition, terms particularly defined in consideration of construction and operation of the embodiments are used only to describe the embodiments and do not define the scope of the embodiments.

In the description of the embodiments, it will be understood that, when an element is referred to as being formed "on" or "under" another element, it can be directly "on" or "under" the other element or be indirectly formed with intervening elements therebetween. It will also be understood that, when an element is referred to as being "on" or "under," "under the element" as well as "on the element" can be included based on the element.

As used herein, relational terms, such as "on"/"upper part"/"above", "under"/"lower part"/"below," and the like, are used solely to distinguish one entity or element from another entity or element without necessarily requiring or implying any physical or logical relationship or order between such entities or elements.

The terms used in the specification are used describe a specific embodiment and are not intended to limit the present disclosure. The singular forms are intended to include the plural forms as well, unless the context clearly indicates otherwise. It should be understood that the term "comprises" or "has" described herein is for designating presence of a feature, a numeral, a step, an operation, a component, a part or a combination thereof disclosed in the specification and does not exclude presence or possibility of addition of one or more other features, numerals, steps, operations, components, parts or combinations thereof.

All terms including technical and scientific terms have the same meanings as generally understood by a person having ordinary skill in the art to which the present disclosure pertains unless mentioned otherwise. Generally used terms, such as terms defined in a dictionary, should be interpreted to coincide with meanings of the related art from the context. Unless differently defined in the present disclosure, such terms should not be interpreted in an ideal or excessively formal manner.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, devices, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter a spoken language understanding apparatus according to embodiments of the present disclosure will be described with reference to the attached drawings.

Figure 3:
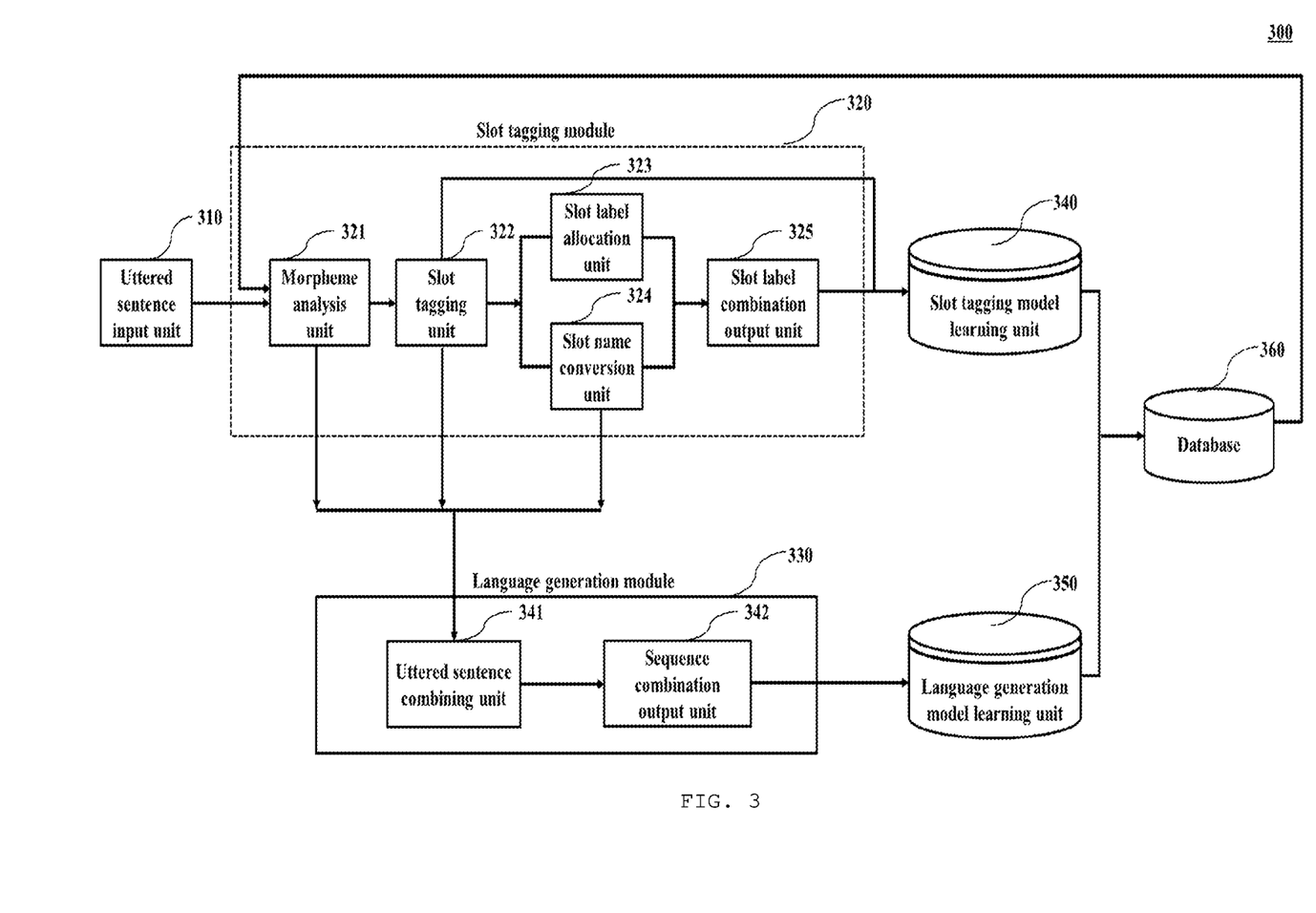
FIG. 3 is a diagram schematically showing a configuration of a spoken language understanding apparatus according to embodiments of the present disclosure.

FIG. 3 is a diagram schematically showing a configuration of a spoken language understanding apparatus according to embodiments of the present disclosure.

As shown in FIG. 3, the spoken language understanding apparatus 300 according to embodiments may include an uttered sentence input unit 310, a slot tagging module 320 and a language generation module 330.

The uttered sentence input unit 310 may receive a result of recognition of a speech uttered by a user. Here, the speech recognition result may be an input sentence obtained by converting the speech uttered by the user into text form.

The slot tagging module 320 may tag a slot corresponding to a semantic entity extracted by analyzing morphemes with respect to a sentence input from the uttered sentence input unit 301 and convert a phrase corresponding to the tagged slot into a delexicalized slot name on the basis of neighboring contextual information. Here, slot tagging refers to a technique of extracting a word corresponding to a concept related to a user's intent in an input sentence.

Hereinafter, subcomponents of the slot tagging module 320 and the language generation module 330 will be described in detail on the basis of an example of a speech recognition result input to the slot tagging module 320 according to embodiments of the present disclosure.

The slot tagging module 320 may include a morpheme analysis unit 321, a slot tagging unit 322, a slot label allocation unit 323, a slot name conversion unit 324 and a slot label combination output unit 325.

Input Sentence 1: Call Hong Gil-Dong, Please

When a sentence in the form of text according to a speech recognition result is input to the slot tagging module 320 from the uttered sentence input unit 310, the morpheme analysis unit 321 may tokenize the input sentence. For example, when a speech recognition result is "call Hong gil-dong, please", the morpheme analysis unit 321 may tokenize the input sentence into "call", "Hong gil-dong" and "please".

The slot tagging unit 322 may extract a word (or phrase) corresponding to a concept related to the user's intent, that is, a semantic entity, from the tokens constituting the input sentence. In other words, the slot tagging unit 322 may tag a slot corresponding to the semantic entity in order to recognize a functional role with respect to the semantic entity. One or more slots may be tagged. For example, since the user has an intent of "making a call" in input sentence 1, "Hong gil-dong" which is a concept related to the intent of "called party" may be extracted as a semantic entity.

Further, the slot tagging unit 322 may further include a semantic entity recognition unit (not shown) which determines whether each token constituting an input sentence is a semantic entity in order to determine delexicalization of a tagged slot which will be described later.

The semantic entity recognition unit (not shown) may determine whether a token is a semantic entity according to binary entity classification and provide a determination result to the slot tagging unit 322 and the slot name conversion unit 324 which will be described later. Here, determination of whether a token is a semantic entity may be performed prior to slot extraction.

Binary entity classification may classify each token constituting an input sentence as a first value when the token is a semantic entity and as a second value when the token is not a semantic entity, and a determination result with respect to a semantic entity may be represented by a binary number including the first value and/or the second value. Here, the first value may be 1 (or 0) and the second value may be 0 (or 1). Meanwhile, binary entity classification described as a method of determining whether a token is a semantic entity is exemplary and it is obvious to those skilled in the art that the present disclosure is not limited thereto.

The slot tagging unit 322 may tag a token corresponding to the first value provided by the semantic entity recognition unit (not shown) as a slot. For example, the semantic entity recognition unit (not shown) may generate a binary sequence of "1, 0, 0, 0, 0" from the aforementioned input sentence 1 and provide the binary sequence to the slot tagging unit 322, and the slot tagging unit 322 may tag "Hong gil-dong" which is a token corresponding to "1" as a slot.

The slot label allocation unit 323 may allocate a slot label to each token constituting an input sentence through a sequential labeling method. Specifically, when a slot is a token, a corresponding slot name is allocated as a slot label. When a slot is not a token, label 0 (out-side) is allocated thereto. Slot labels may be sequentially allocated in the order of input tokens. For example, a slot label of "Hong gil-dong, 0, 0, 0, 0" may be allocated to each token constituting the aforementioned input sentence 1 through the slot label allocation unit 323.

The slot name conversion unit 324 may convert a phrase corresponding to a tagged slot into a delexicalized slot name on the basis of neighboring contextual information. At least one token positioned before and after a slot may be used as neighboring contextual information. For example, "Hong gil-dong" in the aforementioned input sentence 1 may be converted into a delexicalized slot name of "called party" on the basis of neighboring contextual information.

Further, the slot name conversion unit 324 may be provided with a determination result with respect to a semantic entity, which is represented as a binary number including the first value and/or the second value, from the semantic entity recognition unit (not shown) in order to determine whether a slot is delexicalized. For example, when a binary sequence of "1, 0, 0, 0, 0" generated in a semantic entity unit (not shown) is provided to the slot name converter 324, the slot name converter 324 may determine conversion of "Hong gil-dong", which is a token corresponding to "1", into a delexicalized slot name.

The slot label combination output unit 325 may combine a slot label allocated by the slot label allocation unit 323 and a slot name label delexicalized through the slot name converter 324 and provide the combination to a slot tagging model learning unit 340. For example, a slot label of "called party, 0, 0, 0, 0" may be finally output with respect to the aforementioned input sentence 1.

The language generation module 330 may combine an input sentence with a converted slot name to generate a combined sequence. Language generation entails generating a predetermined output sentence for an input sentence and may be mainly used for auto-encoding or neighboring sentence generation. Here, auto-encoding refers to generation of the same sentence as an input sentence and neighboring sentence generation refers to generation of a following utterance for a preceding utterance in a dialogue system.

The language generation module 330 may include a sentence combining unit 341 and a combination output unit 342.

The sentence combining unit 341 may combine delexicalized slot names of slots tagged by the slot tagging unit 322 on the basis of tokens of an input sentence tokenized by the morpheme analysis unit 321 to generate language. For example, the sentence combining unit 341 may generate a combined sequence of "call", "called party" and "please" for the input sentence of "call", "Hong gil-dong" and "please".

The sequence combination output unit 342 may output the combined sequence generated from the sentence combining unit 341 and provide the generated combined sequence to a language generation model learning unit 350.

In addition, the spoken language understanding apparatus 300 according to embodiments of the present disclosure may further include the slot tagging model learning unit 340 which learns combined slot labels provided by the slot tagging module 320, the language generation model learning unit 350 which learns combined sequences provided by the language generation module 330, and a database 360 which stores combined slot labels and combined sequences.

Here, the slot tagging model learning unit 340 may learn a determination result with respect to a semantic entity represented by a binary number including the first value and/or the second value from the semantic entity recognition unit (not shown).

Further, the database 360 may store learned data from the slot tagging model learning unit 340 and the language generation model learning unit 350, e.g., combined slot labels, determination results with respect to semantic entities and combined sequences, provide the learned data to the slot tagging module 320 such that repeated learning is performed for input sentences in the same pattern, and store (or accumulate) data obtained as a result of the repeated learning.

The spoken language understanding apparatus 300 according to embodiments of the present disclosure may simultaneously learn slot tagging and language generation. Particularly, the spoken language understanding apparatus 300 may learn a context with respect to sentences in the same pattern by outputting delexicalized slot names and/or sentences for an input sentence and, even if a token including an out-of-vocabulary (OOV) word is input, can extract a slot corresponding to the token, improving slot tagging performance.

Hereinafter, a data learning method according to the spoken language understanding apparatus according to embodiments of the present disclosure will be described with reference to FIGS. 3 and 4.

Figure 4:
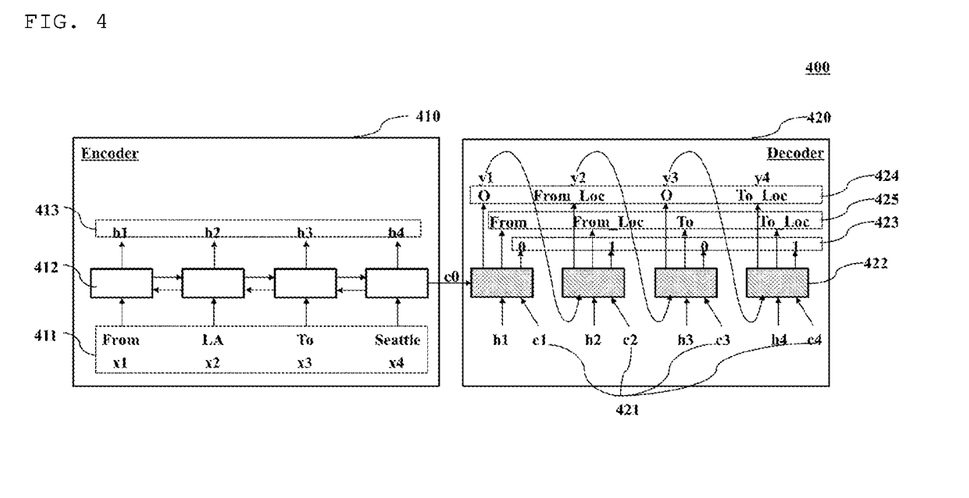
FIG. 4 is a diagram showing data learning by means of the spoken language understanding apparatus according to embodiments of the present disclosure.

FIG. 4 is a diagram showing data learning according to the spoken language understanding apparatus according to embodiments of the present disclosure As shown in FIG. 4, a model learns data, e.g., combined slot labels, determination results with respect to semantic entities, and combined sequences, using a sequence-to-sequence attention model.

An encoder 410 may encode an input sentence and a decoder 420 may perform slot tagging, combined sequence generation and semantic entity determination. The encoder 410 and the decoder 420 may be functionally classified according to operations.

Hereinafter, a method of learning the aforementioned data in the encoder 410 and the decoder 420 according to an embodiment of the present disclosure will be described in detail on the basis of input sentence 2.

Input Sentence 2: From LA to Seattle

The encoder 410 may input a plurality of input tokens 411 (x1 to X4) obtained by tokenizing the input sentence according to the morpheme analysis unit 321 to neural networks 412 to output a plurality of hidden states 413 (h1 to h4).

The decoder 420 may input the hidden states 413 and attentions 421 (c1 to c4) to neural networks 422 to output a plurality of output tokens y1 to y4, thereby predicting a slot label. Here, with respect to a current output token $y_i$ a previous output token $y_{i-1}$, a current hidden state $h_i$ and a current attention $c_i$ may be considered, and i represents a time step.

The decoder 420 may perform semantic entity determination 423, slot tagging 424 and combined sequence generation 425, as described above, and learn the respective operations.

Referring to FIGS. 3 and 4 together, the semantic entity recognition unit (not shown) may perform (or output) determination of a semantic entity according to binary entity classification and learn the determination result. For example, since a user has an intent to extract information on "origin" and "destination" in the aforementioned input sentence 2, the semantic entity recognition unit (not shown) may determine input tokens of "LA" and "Seattle" as semantic entities, allocate "1" to "LA" and "Seattle" and allocate "0" to "from" and "to" to output a determination result of "0, 1, 0, 1" according to the order of input tokens.

Further, the semantic entity recognition unit (not shown) may provide the semantic entity determination result 423 to the slot tagging unit 322 and the slot name conversion unit 324, the slot tagging module 320 may output the combined slot label 424 to perform a slot tagging operation, and the language generation module 330 may output the combined sequence 425 to perform a language generation operation.

While the method of generating the combined slot label 424 and the combined sequence 425 has been described, the method will be briefly described below on the basis of input sentence 2 for convenience of description.

For example, "LA" and "Seattle" may be respectively converted into delexicalized slot names of "From Loc (location)" and "To_Loc (location)" on the basis of neighboring contextual information of input sentence 2, label "0 (outside)" may be allocated to "from" and "to", and the slot label combination output unit 325 may generate a combined slot label 425 of "0, From_Loc, 0, To-Loc".

In addition, the language generation module may combine delexicalized slot names of tagged slots on the basis of the tokens of the tokenized input sentence to generate a combined sequence 424 of "From, From_Loc, To, To_Loc".

As described above, the spoken language understanding apparatus according to embodiments of the present disclosure may generate data including a combined slot label, a determination result with respect to semantic entities and a combined sequence and learn distribution of the data.

Combined slot label distribution may be defined as represented by Equation 1 below.

$$P(y_i|y<i;x)=\text{SlotLabelDist}(s_i) \quad \text{[Equation 1]}$$

Here, i represents a time step, $y_i$ represents an i-th output token, x represents an input token, and the equation represents a probability distribution in which previous all output tokens and input tokens are converted into current output tokens.

Combined sequence distribution may be defined as represented by Equation 2 below.

$$P(y_i^{word}|y<i;x)=\text{WordDist}(s_i) \quad \text{[Equation 2]}$$

Here, i represents a time step, $y_i^{word}$ represents an i-th output word, x represents an input word.

Semantic entity distribution may be defined as represented by Equation 3 below.

$$P(z_i|y<i;x)=\text{BinaryClassDist}(s_i) \quad \text{[Equation 3]}$$

Here, z represents the first value or the second value, i represents a time step, $z_i$ represents an i-th z value, and x represents an input token. The first value may be 1 (or 0) and the second value may be 0 (or 1).

Further, a distribution probability of data including combined slot labels, determination results with respect to semantic entities and combined sequences may be determined by taking into account values obtained by applying a slot tagging weight to a probability according to whether output tokens are the first value or the second value and values obtained by applying a language generation learning weight to a probability according to whether output words are the first value or the second value and may be defined as represented by Equation 4 below.

$$\max_\theta \sum_{i=0}^{T} [\alpha_s \log P(y_i | y_{<i}; x, \theta) + \alpha_w \log P(y_i^{word} | y_{<i}; x, \theta)]$$ [Equation 4]

Here $\alpha_s$ and $\alpha_\omega$ represent learning weights of slot tagging and language generation according to $z_i$, respectively.

Equation 4 represents a learning distribution probability for data including combined slot labels, determination results with respect to semantic entities and combined sequences. Since learned data may include delexicalized slot names, the spoken language understanding apparatus according to embodiments of the present disclosure can improve slot label extraction performance and OOV processing performance.

Hereinafter, a method of generating a recombined slot label will be described with reference to FIG. 5.

Figure 5:
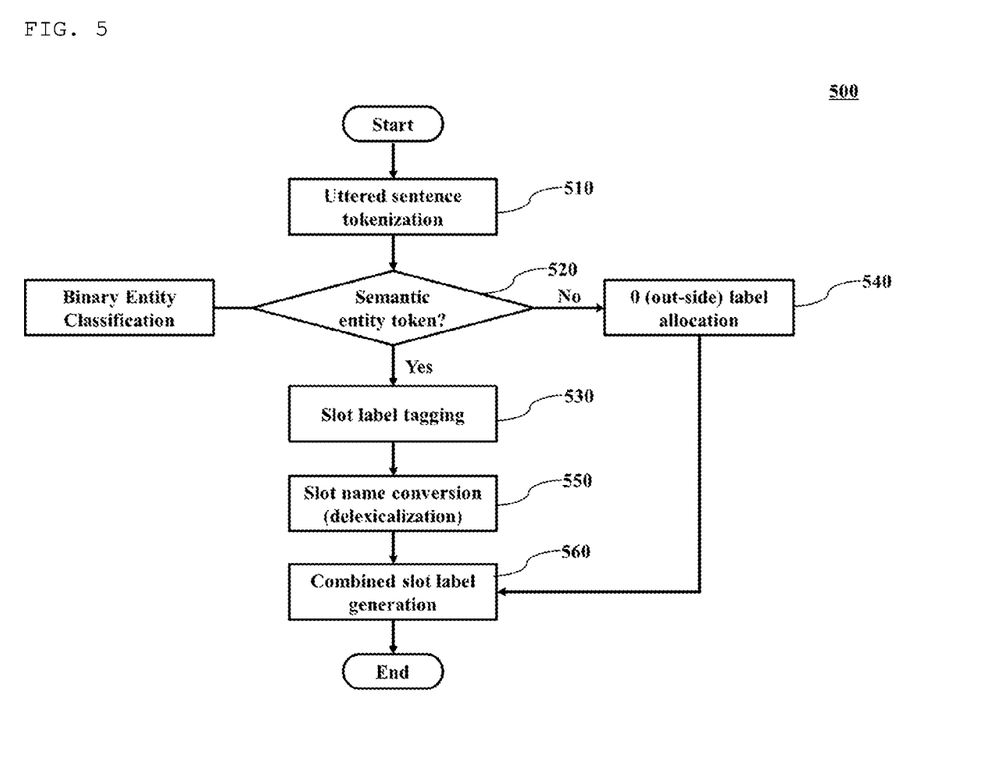
FIG. 5 is a schematic flowchart showing a method of generating a combined slot label according to embodiments of the present disclosure.

FIG. 5 is a schematic flowchart showing a method of generating a combined slot label according to embodiments of the present disclosure.

The method of generating a combined slot label may include an uttered sentence tokenization step S510, a semantic entity determination step S520, a slot label tagging step S530, a slot name conversion step S550 and a combined slot label generation step S560.

In the uttered sentence tokenization step S510, morphemes of an input sentence obtained by converting speech uttered by a user into text may be analyzed and tokenized to generate a plurality of tokens.

In the semantic entity determination step S520, it is determined whether the plurality of tokens is a word (or phrase) corresponding to a concept related to a user's intent, that is, a semantic entity. Here, semantic entity determination may be performed according to binary entity classification. Binary entity classification may classify each token constituting an input sentence as a first value when the token is a semantic entity and classify the token as a second value when the token is not a semantic entity. A semantic entity determination result may be represented as a binary including the first value and/or the second value. Here, the first value may be 1 (or 0) and the second value may be 0 (or 1). Binary entity classification described as a semantic entity determination method is exemplary and it is obvious to those skilled in the art that the present disclosure is not limited thereto.

The slot label tagging step S530 may be performed if a specific token is a semantic entity as a semantic entity determination result and 0 (out-side) label allocation step S540 may be performed if a specific token is not a semantic entity.

In the slot label tagging step S530, a token corresponding to the first value output according to binary entity classification may be tagged as a slot. In other words, a slot corresponding to a semantic entity may be tagged in order to recognize a functional role for semantic entities, and at least one slot may be tagged.

In the slot name conversion step S550, a phrase corresponding to a slot tagged in the slot label tagging step S530 may be converted into a delexicalized slot name on the basis of neighboring contextual information. Here, at least one token positioned before and after the slot may be used as the neighboring contextual information.

In the 0 (out-side) label allocation step S540, label 0 (out-side) may be allocated to a token corresponding to the second value output according to binary entity classification.

In the combined slot label generation step S560, a delexicalized slot name label generated in the slot name conversion step S550 and a slot label allocated in the 0 (out-side) label allocation step S540 may be combined to generate a combined slot label.

As described above, it is possible to learn a context with respect to sentences in the same pattern by generating a delexicalized slot name for an input sentence. Further, even when a token including an OOV is input, a slot corresponding to the token can be extracted and thus slot tagging performance can be improved.

Hereinafter, slot tagging in the spoken language understanding apparatus according to embodiments of the present disclosure and a general language understanding apparatus when an OOV word is input will be described through comparison with reference to FIGS. 6 and 7.

Figure 6:
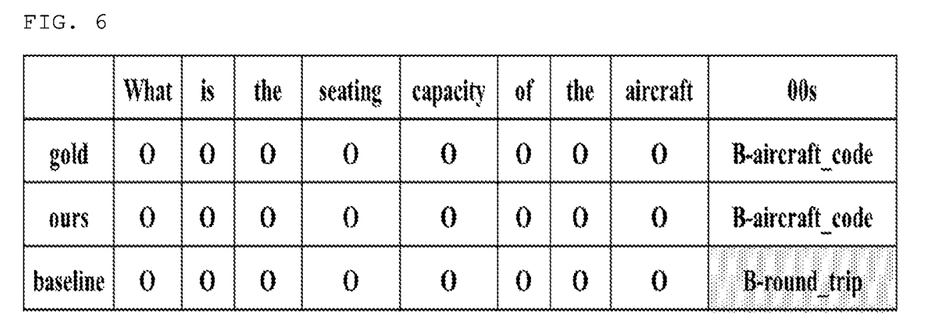
FIGS. 6 and 7 are tables for comparing slot tagging between the spoken language understanding apparatus according to embodiments of the present disclosure and a general language understanding apparatus when out-of-vocabulary (OOV) words are input.
Figure 7:
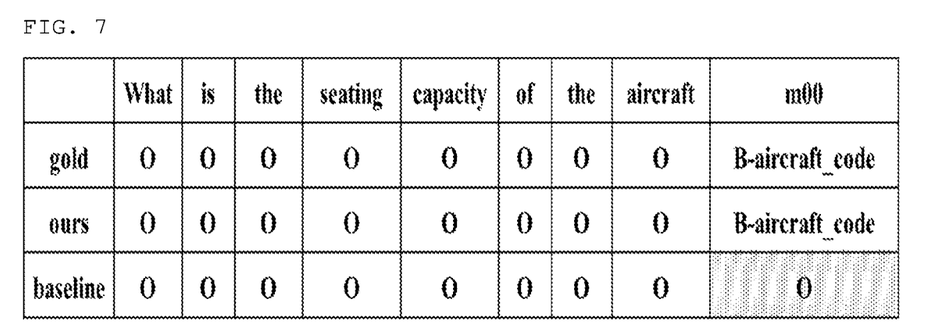

FIGS. 6 and 7 are tables for comparing slot tagging between the spoken language understanding apparatus according to embodiments of the present disclosure and a general language understanding apparatus when an OOV word is input.

In FIGS. 6 and 7, "gold" refers to a right answer, "ours" refers to the spoken language understanding apparatus according to embodiments of the present disclosure, and "baseline" refers to a model which learns only slot tagging shown in FIG. 1. Description will be given on the basis of the following input sentence 3.

Input Sentence 3: What is the Seating Capacity of the Aircraft ( )

In input sentence 3, since a user has an intent to extract information on seating capacity of a "specific aircraft", the concept related to the intent, "specific aircraft", may be extracted as a semantic entity.

Referring to FIGS. 6 and 7, when OOV words such as "ooS" and/or "moo" are given as input tokens at the end of input sentence 3, the model (baseline) which learns only general slot tagging may tag the OOV word as "round trip" (refer to FIG. 6) or tag the OOV word as "0 (out-side)" label (refer to FIG. 7). As described above, the model which learns only slot tagging may not understand the intent of the user (refer to FIG. 6) or may not perform slot tagging (Refer to FIG. 7) if a typo or an OOV word is added to an input sentence even when sentences in the same pattern are input.

On the other hand, the spoken language understanding apparatus ("ours") according to embodiments of the present disclosure converts an OOV word into a delexicalized slot name "aircraft code" on the basis of neighboring contextual information, e.g., aircraft, and generates a combined slot label and a combined sequence to learn a sentence pattern, and thus can perform slot tagging even if OOV words such as "ooS" and/or "moo" are given as input tokens at the end of input sentence 3. In other words, the spoken language understanding apparatus according to an embodiment of the present disclosure may learn sentences in the same pattern through a combined slot label obtained by converting a word (or phrase) corresponding to a slot into a delexicalized slot name on the basis of neighboring contextual information and a combined sequence and thus can correctly understand the intent of the user.

Hereinafter, effects when a language generation model is learned in the spoken language understanding apparatus according to embodiments of the present disclosure and a general language understanding apparatus will be described through comparison with reference to FIGS. 8 and 9.

Figure 8:
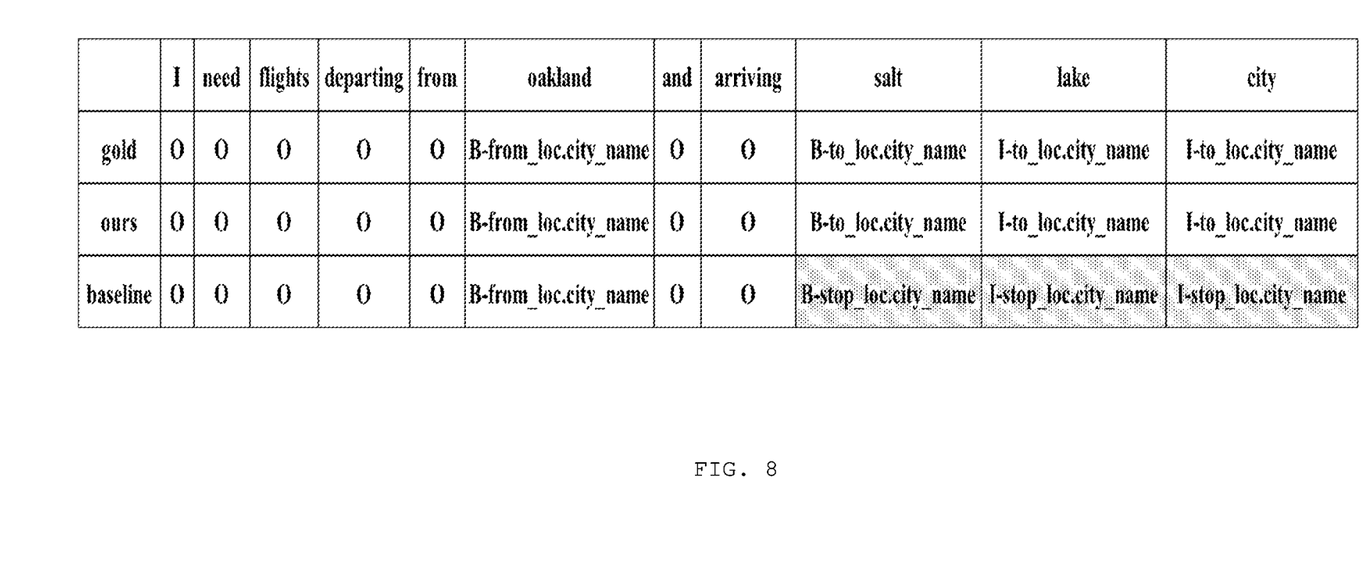
FIGS. 8 and 9 are tables for comparing slot tagging according to language generation model learning between the spoken language understanding apparatus according to embodiments of the present disclosure and a general language understanding apparatus.
Figure 9:
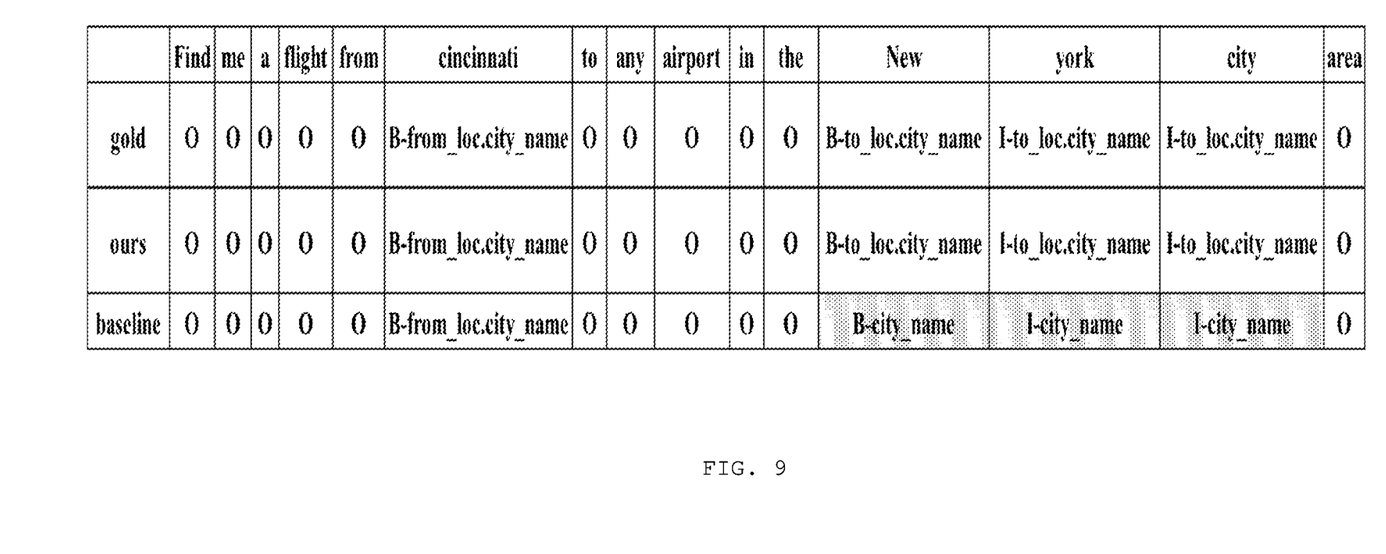

FIGS. 8 and 9 are tables for comparing slot tagging according to language generation model learning between the spoken language understanding apparatus according to embodiments of the present disclosure and a general language understanding apparatus.

In FIGS. 8 and 9, "gold" refers to a right (i.e., correct) answer, "ours" refers to the spoken language understanding apparatus according to an embodiment of the present disclosure, and "baseline" refers to a model which learns only slot tagging shown in FIG. 1. FIG. 8 is based on the following input sentence 4 and FIG. 9 is based on the following input sentence 5.

Input Sentence 4: I Need Flights Departing from Oakland and Arriving in Salt Lake City.

Input Sentence 5: Find Me a Flight from Cincinnati to any Airport in the New York City Area.

In input sentences 4 and 5, a user has an intent to extract aircraft information on "destination", and thus the concept related to the intent, "destination", may be extracted as a semantic entity.

Referring to FIGS. 8 and 9, the spoken language understanding apparatus (ours) according to embodiments of the present disclosure may learn a delexicalized slot name "to_loc.city" with respect to tokens input after "from Oakland" and/or "from Cincinnati". Accordingly, slot tagging conforming to the context can be performed. In other words, the spoken language understanding apparatus (ours) according to embodiments of the present disclosure can generate a combined sequence by combining delexicalized slot names on the basis of tokens of a tokenized input sentence and thus can learn a sentence pattern to perform slot tagging adapted to a context.

On the other hand, the general model (baseline) which learns only slot tagging does not learn a language generation model and thus may slot-tag "stop_loc.city" and/or "city" instead of "to_loc.city" with respect to tokens input after "from Oakland" and/or "from Cincinnati". Such slot tagging may cause inappropriate following utterance because the intent of the user is not reflected therein or understood thereby.

As described above, according to embodiments of the present disclosure, slot tagging suitable for a context can be performed because a language generation model is learned, and thus inducing inappropriate following utterance can be prevented.

Although some embodiments have been described above, various other embodiments are possible. The above-described embodiments may be combined in various manners unless they are incompatible technologies to realize new embodiments.

The spoken language understanding apparatus and the spoken language understanding method using the apparatus according to the above-described embodiments may be used in dialog system services such as an intelligent secretary and a dialogue navigation system.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A spoken language understanding apparatus comprising:
a slot tagging module including:
a morpheme analysis unit configured to analyze morphemes with respect to an uttered sentence,
a slot tagging unit configured to tag slots corresponding to a semantic entity from a plurality of input tokens generated according to the analyzed morphemes,
a slot label allocation unit configured to sequentially allocate a label to tokens which do not correspond to the slots according to an order of the plurality of input tokens;
a slot name conversion unit configured to convert phrases corresponding to the tagged slots into delexicalized slot names based on neighboring contextual information;
a slot label combination output unit configured to output a combined slot label by combining a slot label allocated by the slot label allocation unit with a slot name converted by the slot name conversion unit;
a language generation module configured to generate a combined sequence by combining the delexicalized slot names based on the plurality of input tokens;
a slot tagging model learning unit configured to learn whether at least one of the plurality of input tokens is the semantic entity, as determined by the semantic entity recognition unit, and a distribution of each combined slot label; and
a language generation model learning unit configured to learn a distribution of the combined sequence,
wherein the slot tagging unit includes a semantic entity recognition unit configured to determine whether at least one of the plurality of input tokens is the semantic entity, and to generate, based on the determination, at least a first value assigned to a token which is the semantic entity or a second value assigned to a token which is not the semantic entity.

2. The spoken language understanding apparatus according to claim 1, wherein the slot tagging module is configured to generate a learning distribution probability of data, which includes whether at least one of the plurality of input tokens is the semantic entity, as determined by the semantic entity recognition unit, the combined slot label, and the combined sequence, based on a value obtained by applying a slot tagging weight to a probability of whether an output token is the first value or the second value and based further on a value obtained by applying a language generation learning weight to a probability of whether a word is the first value or the second value per learning round.

3. A spoken language understanding method comprising:
tokenizing an uttered sentence according to an analysis of morphemes with respect to the uttered sentence;
determining whether at least one of the plurality of input tokens is the semantic entity;
generating, based on the determination, at least a first value assigned to a token which is the semantic entity or a second value assigned to a token which is not the semantic entity;
tagging slots corresponding to a semantic entity from a plurality of input tokens generated according to the analyzed morphemes;
converting phrases corresponding to the tagged slots into delexicalized slot names based on neighboring contextual information;

generating a combined sequence by combining the delexicalized slot names based on the plurality of input tokens;
sequentially allocating a label to tokens which do not correspond to the slots according to an order of the plurality of input tokens;
outputting a combined slot label by combining an allocated slot label with a converted slot name;
learning whether at least one of the plurality of input tokens is the semantic entity, as determined by the semantic entity recognition unit, and a distribution of each combined slot label; and
learning a distribution of the combined sequence.

4. The spoken language understanding method according to claim 3, further comprising generating a learning distribution probability of data, which includes whether at least one of the plurality of input tokens is the semantic entity, as determined by the semantic entity recognition unit, the combined slot label, and the combined sequence, based on a value obtained by applying a slot tagging weight to a probability of whether an output token is the first value or the second value and based further on a value obtained by applying a language generation learning weight to a probability of whether a word is the first value or the second value per learning round.

* * * * *